United States Patent
Madni et al.

(10) Patent No.: US 6,985,018 B2
(45) Date of Patent: Jan. 10, 2006

(54) PROGRAMMABLE, MULTI-TURN, PULSE WIDTH MODULATION CIRCUIT FOR A NON-CONTACT ANGULAR POSITION SENSOR

(75) Inventors: Asad M. Madni, Los Angeles, CA (US); Jim B. Vuong, Northridge, CA (US); Philip Vuong, Northridge, CA (US)

(73) Assignee: BEI Sensors & Systems Company, Inc., Sylmar, CA (US)

( * ) Notice: Subject to any disclaimer, the term of this patent is extended or adjusted under 35 U.S.C. 154(b) by 0 days.

(21) Appl. No.: 10/813,329

(22) Filed: Mar. 29, 2004

(65) Prior Publication Data

US 2005/0212577 A1    Sep. 29, 2005

(51) Int. Cl.
*H03K 3/017* (2006.01)
(52) U.S. Cl. ............... 327/176; 327/172; 327/177; 73/862.326; 324/207.17
(58) Field of Classification Search ........ 332/109–111; 73/862.326; 324/207.17; 327/172, 176, 327/177
See application file for complete search history.

(56) References Cited

U.S. PATENT DOCUMENTS

| | | | |
|---|---|---|---|
| 4,628,475 A * | 12/1986 | Azusawa et al. ........... 708/845 |
| 6,304,076 B1 | 10/2001 | Madni et al. | |
| 6,448,759 B2 * | 9/2002 | Madni et al. .......... 324/207.17 |
| 6,520,031 B2 * | 2/2003 | Madni et al. .......... 73/862.326 |
| 6,545,621 B1 | 4/2003 | Madni et al. | |

OTHER PUBLICATIONS

Madni et al., The Next Generation of Position Sensing, Parts 1 and 2, Mar. & Apr. 2001. 16 pgs., vol. 18, No. 3 and 4, Advanstar, USA.

* cited by examiner

*Primary Examiner*—David Mis
(74) *Attorney, Agent, or Firm*—Christie, Parker & Hale, LLP

(57) ABSTRACT

A multi-turn pulse width modulation (PWM) generator for generating a PWM output corresponding to multiple 360 degree turns. A counter receives a reference signal, and counts a number of cycles of the reference signal to generate a binary output corresponding to the number of cycles counted. A frequency divider receives a sensor output signal, and divides the frequency of the sensor output signal by the number of turns in the multiple turns to generate a frequency divided signal. The sensor output signal has substantially the same frequency as the reference signal, but can be offset in phase from the reference signal. A demultiplexer receives the binary output, and generates a plurality of turn indicator signals, each corresponding to one of the multiple turns. A multiplexer receives the turn indicator signals and a mechanical turn indication signal, and selects one of the turn indicator signals that corresponds to the mechanical turn indication signal. At least one flip flop receives the selected one of the turn indicator signals and the frequency divided signal, and generates the PWM output using the selected one of the turn indicator signals and the frequency divided signal. The multi-turn PWM generator may be combined with a single-turn angular position sensor to form a multi-turn angular position sensor.

20 Claims, 8 Drawing Sheets

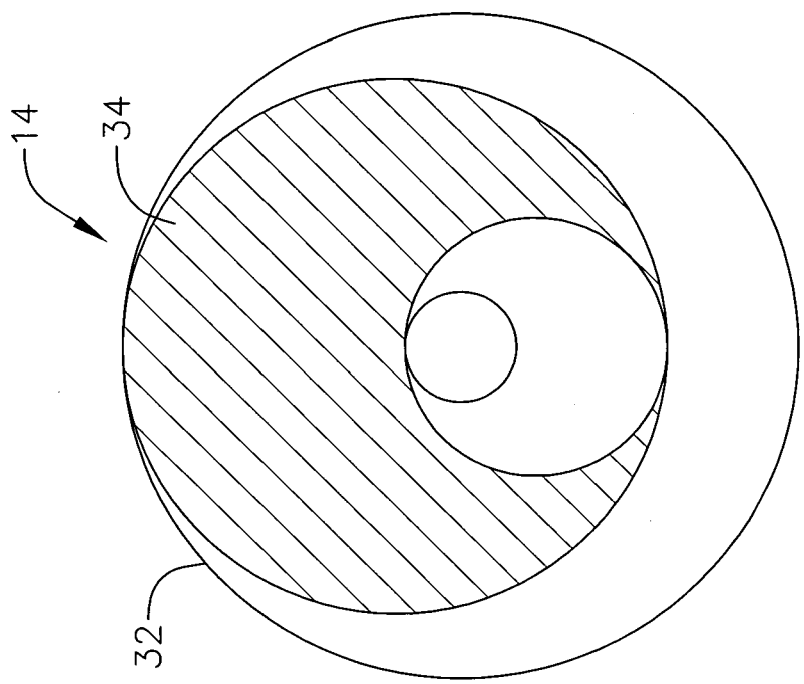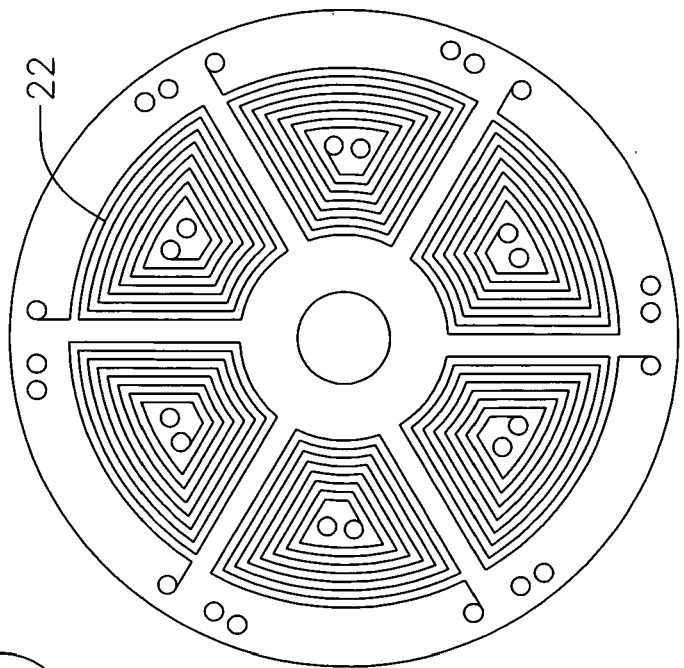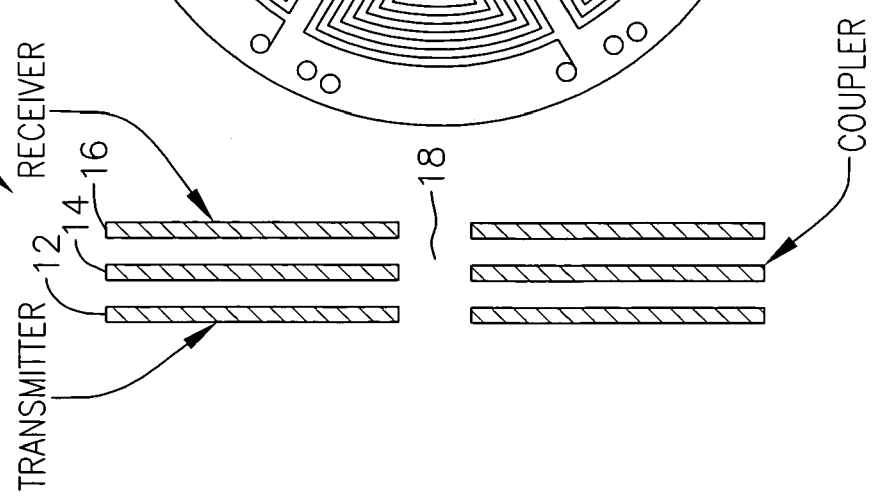

PROGRAMMABLE, MULTI-TURN, PULSE WIDTH MODULATION CIRCUIT FOR A NON-CONTACT ANGULAR POSITION SENSOR

FIELD OF THE INVENTION

The present invention is related to a pulse width modulation (PWM) circuit for a angular position sensor, and more particularly to a multi-turn, non-contact angular position sensor.

BACKGROUND

Recently in the automotive industry, electric motors have been replacing power steering hydraulic pumps because of the requirements for electronic stability control and roll prevention systems and better fuel efficiency (i.e. engine power reduction). The main steering angle sensor for such electric motors needs to be a multi-turn rotary position sensor.

Present steering angle sensing techniques include optical encoders with multi-turn counters that require specialized algorithms to combine the turn counter code to the single turn optical encoder information. Another technique used is a gear reduction ratio (in this application, 5:1) technique to convert a multi-mechanical turn into a single turn rotation. However, this method degrades the resolution and linearity accuracy performance of the sensor. By way of example, a sensor with 1% of linearity error will be converted to a 5% error due to the 5:1 gear reduction ratio, and a step size of 0.01 degree in a single-turn unit becomes 0.05 degree/step in a five-turn unit.

Therefore, it is desirable to provide a multi-turn rotary position sensor that has better resolution and linearity accuracy performance for automotive and other applications.

SUMMARY

In an exemplary embodiment of the present invention, a multi-turn pulse width modulation (PWM) generator for generating a PWM output corresponding to multiple 360 degree turns is provided. A counter receives a reference signal, and counts a number of cycles of the reference signal to generate a binary output corresponding to the number of cycles counted. A frequency divider receives a sensor output signal, and divides a frequency of the sensor output signal by the number of turns in the multiple turns to generate a frequency divided signal. The sensor output signal has substantially the same frequency as the reference signal, but can be offset in phase from the reference signal. A demultiplexer receives the binary output, and generates a plurality of turn indicator signals, each corresponding to one of the multiple turns. A multiplexer receives the turn indicator signals and a mechanical turn indicator signal, and selects one of the turn indicator signals that corresponds to the mechanical turn indicator signal. At least one flip flop receives the selected one of the turn indicator signals and the frequency divided signal, and generates the PWM output using the selected one of the turn indicator signals and the frequency divided signal.

In another exemplary embodiment of the present invention, a multi-turn angular position sensor for sensing rotation about an axis is provided. The sensor includes a transmitter disk having a plurality of transmitter loop antennas formed thereon, and a receiver disk having a plurality of receiver loop antennas formed thereon. Each receiver loop antenna corresponds to one of the transmitter loop antennas. The transmitter disk and the receiver disk are substantially fixed with respect to each other about the axis. The sensor also includes a coupler disk having an attenuation pattern formed thereon for variably attenuating signals transmitted from the transmitter loop antennas and received by the receiver loop antennas. The coupler disk is rotatable about the axis with respect to the transmitter and receiver disks. A digital signal generator generates a plurality of local oscillator signals and a reference signal. A mixer receives the local oscillator signals and the signals received by the receiver loop antennas, and generates a sensor output signal representing an angular position of the coupler disk about the axis. A multi-turn PWM generator generates a PWM output corresponding to multiple 360 degree turns.

In yet another exemplary embodiment of the present invention, a method of generating a multi-turn pulse width modulation (PWM) signal corresponding to multiple 360 degree turns is provided. A number of cycles of a reference signal is counted to generate a binary output corresponding to the number of cycles counted. A frequency of a sensor output signal is divided by the number of turns in the multiple turns to generate a frequency divided signal, wherein the sensor output signal has substantially the same frequency as the reference signal, but can be offset in phase from the reference signal. A plurality of turn indicator signals are generated using the binary output, each said turn indicator signal corresponding to one of the multiple turns. One of the turn indicator signals that corresponds to a mechanical turn indicator signal is selected. The PWM output is generated using the selected one of the turn indicator signals and the frequency divided signal.

These and other aspects of the invention will be more readily comprehended in view of the discussion herein and accompanying drawings.

BRIEF DESCRIPTION OF THE DRAWINGS

FIG. 1 is a side view of an angular position sensor, which may be used to implement exemplary embodiments of the present invention;

FIG. 2 is a plan view of both transmitter and receiver portions of FIG. 1;

FIG. 3 is a plan view of a coupler disk of FIG. 1;

DETAILED DESCRIPTION

Figure 4:
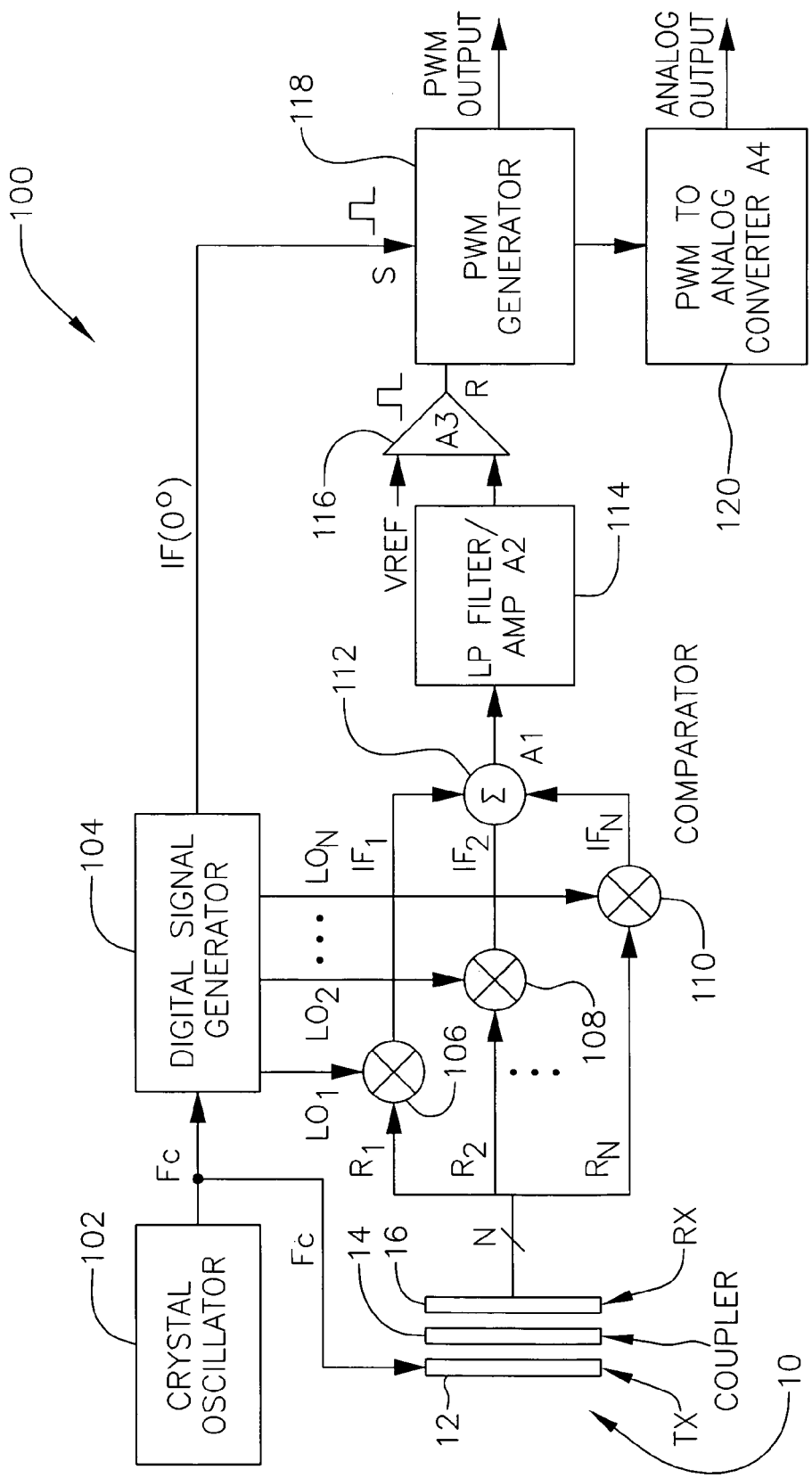
FIG. 4 is a functional block diagram of an angular position sensor, which may be used to implement exemplary embodiments of the present invention.

In exemplary embodiments of the present invention, a programmable, multi-turn (MT), PWM circuit for a non-contact angular position sensor is provided. The multi-turn non-contact angular position sensor (MT-NCAPS) of the present invention is based on an angular position sensor disclosed in U.S. Pat. No. 6,304,076 entitled "Angular Position Sensor with Inductive Attenuating Coupler," the entire content of which is incorporated by reference herein. In the exemplary embodiments described below, the MT PWM circuit together with a single-turn NCAPS produces a multiple-turn output of a full (0° to 360°) cycle of a PWM signal. The NCAPS or the MT-NCAPs may simply be referred to as an "angular position sensor" herein.

Referring now to FIG. 1, an angular position sensor 10 includes a transmitter 12 and a receiver 16 having a coupler disk 14 interposed therebetween. As can be seen in FIG. 2, both the transmitter 12 and the receiver 16 each have formed thereon a plurality of loop antennas 22. The loop antennas are formed from independent spiral conductive coils that are segmentally arranged in a circular pattern around the respective disk of the transmitter and the receiver. The six antennas 22 of FIG. 2 completely encircle the 360 degrees of the disk. While six loop antennas 22 are shown in FIG. 2, the number of loop antennas on the transmitter/receiver depends on the desired phase separation between adjacent channels, and may be different in other embodiments.

The transmitter 12 and the receiver 16 are substantially fixed with respect to one another. The coupler disk 14 turns in accordance with the mechanical turn of the device in which the angular sensor is used. Each loop antenna 22 in the transmitter 12 is used to transmit a signal that is received by a corresponding loop antenna 22 in the receiver. When there is no interfering (attenuating) object in the signal path, the amplitude of the received signal is maximum. However, if a attenuating object is used to cause interference in this path, the amplitude of the received signal is attenuated. The received signal is attenuated proportionally to the amount of interference provided by the interfering object.

FIG. 3 is a coupler disk 30 having a disk 32 on which a coupler pattern 34 is formed. The coupler pattern 34 provides the variable attenuation in the angular position sensor 10 as an interfering (attenuating) object. The disk 32, for example, is made of an insulating material such as plastic. The coupler pattern 34 is made of metal such as copper.

Theoretically, a single channel should be adequate to detect and provide the position and/or angular displacement information. However, since the detected amplitude is also affected by the separation between the transmitter 12 and the receiver 16, and also the power level of the transmitted signal, errors resulting from this uncertainty may not provide performance acceptable for critical automotive, industrial, and/or aerospace applications. Therefore, a multi-channel system with an amplitude to phase conversion technique is used in the angular position sensor to convert the amplitude information into phase information.

The phase separation in degrees between adjacent channels is determined by $\Delta\theta=2\pi/N$, where N is the number of channels. Therefore, in the angular position sensor illustrated in FIG. 2, $\Delta\theta=\pi/3$ since N=6. In an angular position sensor functional block diagram 100 of FIG. 4, the angular position sensor 10 receives a frequency Fc generated by a crystal oscillator 102. The frequency Fc, for example, may be 1 MHz. The frequency used may be different in other embodiments. The frequency Fc is also provided to a digital signal generator 104, which generates a plurality of local oscillator signals $LO_1$ through $LO_N$. The digital signal generator 104 also generates a reference signal S, which represents a zero degree intermediate frequency (IF) signal. The reference signal S may have a frequency of 2.22 KHz, for example, or any other suitable frequency. The local oscillator signals are approximately the same in frequency as the frequency Fc. However, they are offset in phase from each other by $\Delta\theta$, which is 60 degrees (i.e., $\pi/3$) for the case where N=6. Each of the local oscillator signals, for example, may be represented by $LO_i=\cos\omega_c-\cos[\omega_0 t+2\pi(i/N)]$, where $\omega_c$ is the transmitted signal frequency, and $\omega_0$ is a predetermined IF.

Meanwhile, N received signals $R_1$ through $R_N$ are generated by the angular position sensor 10. Since the coupler pattern 34 interferes with and attenuates the transmission of signal between the loop antennas 22 of the transmitter 12 and the receiver 16, the received signals have different amplitude based on the angular position of the coupler disk 14. The signal amplitude at each receiver ($R_i$), for example, is defined by $R_i(t)=A_i \cos(\omega_c t)$, where $A_i=A\cos[\theta+2\pi(i/N)]$. In other words, while A is the magnitude of the signal transmitted by each of the loop antennas 22 in the transmitter 12, due to variable attenuation provided by the coupler disk 14, the magnitude of the signal received by the loop antennas 22 in the receiver 16 are different from one another and are given by $A_i=A\cos[\theta+2\pi(i/N)]$, and depends on the angular position ($\theta$) of the coupler disk 14.

The received signals $R_1$ through $R_N$ are first mixed with the local oscillator signals $LO_1$ through $LO_N$. First, the received signals are multiplied by the corresponding local oscillator signals by multipliers 106, 108 and 110, respectively, to generate IF signals $IF_1$ through $IF_N$. Based on the mixer down conversion process, the relationship between LO, IF and RF (transmitted frequency) is defined by IF=RF−LO. Assuming a lossless mixer, each of the IF signals may be represented by $IF_i=A_i \cos[\omega_0 t+2\pi(i/N)]$.

The IF signals are then converted into a single sinusoidal signal using a summing amplifier 112 such that the phase shift changes of the signal depend on the angular position of the coupler disk. Since the signals received by each of the channels are ratiometric with respect to each other, variations in the transmitted signal amplitude have no effect on the resulting phase information. The signal at the output of the amplifier 112 is given by $IF=\frac{1}{2}A\cos(\omega_0-\theta)$. From this equation, it can be seen that the output signal of the amplifier 112 is a phase relationship representing the angular position of the coupler disk 14 and is not dependent on the transmitted signal amplitude variation. The signal output of the summing amplifier 112 is passed through a low pass filter/amplifier 114 and a comparator 116 to generate a combined received signal R (which may also be referred to hereafter as a "received signal").

Figure 5A:
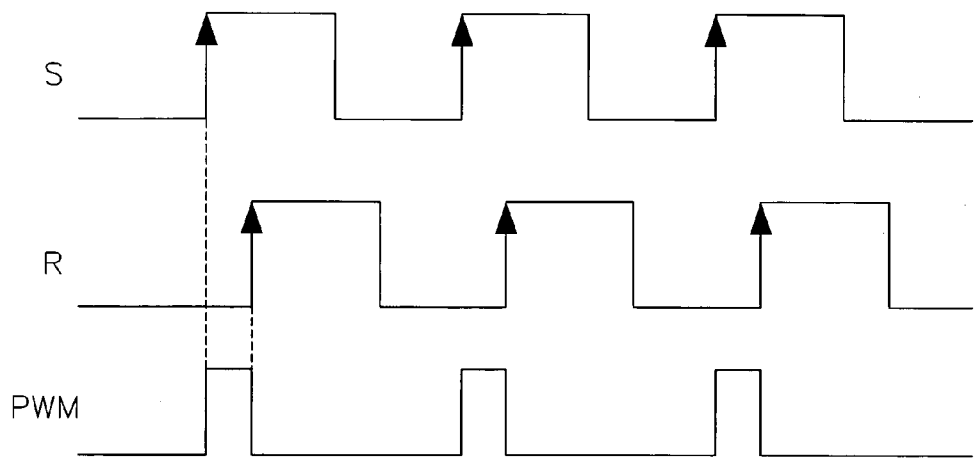
FIGS. 5A and 5B are timing diagrams that illustrate 10% and 40% duty cycles, respectively, of a single-turn angular position sensor.
Figure 5B:
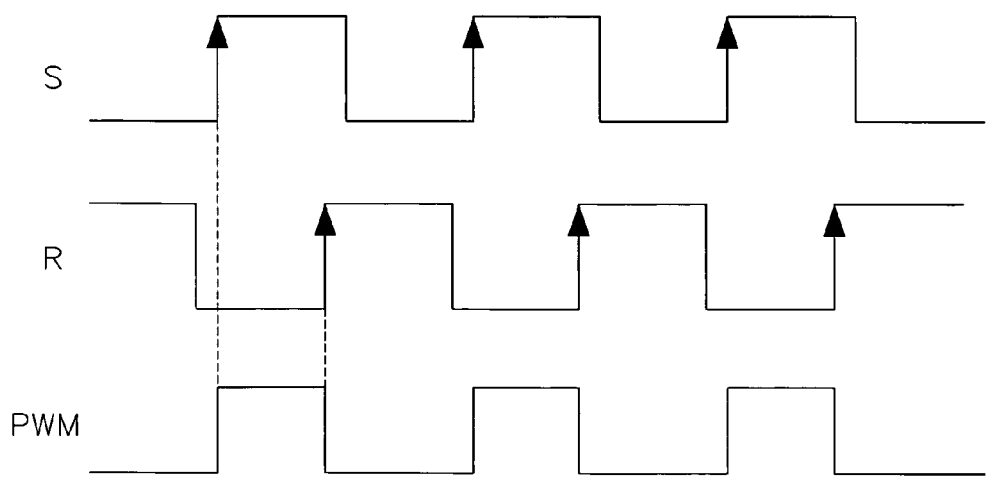
Figure 8:
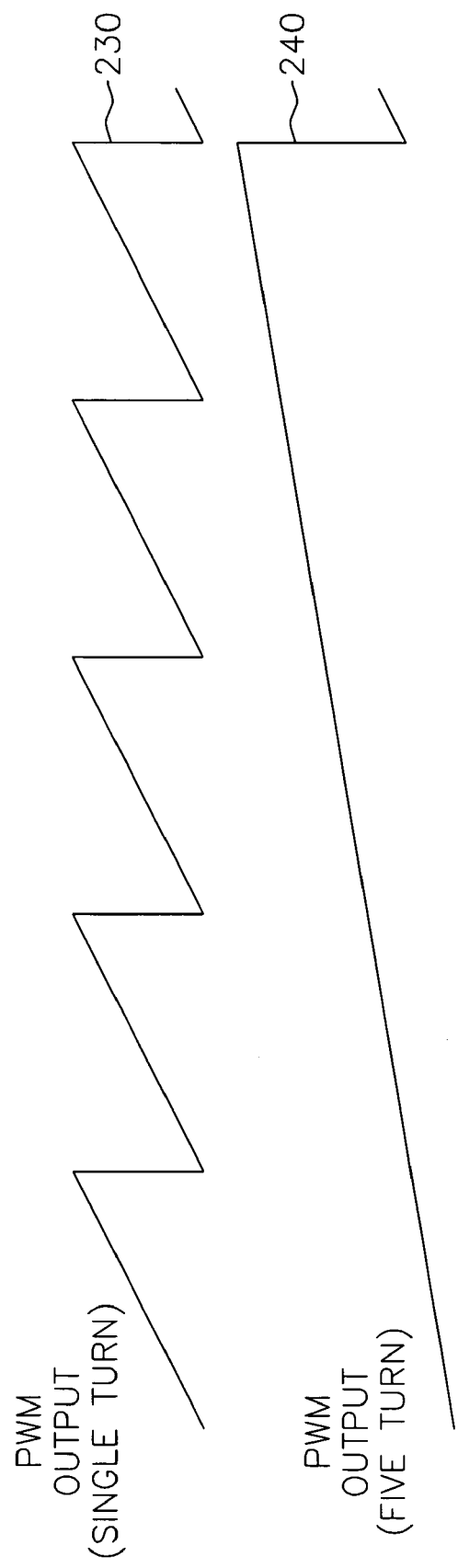
FIG. 8 shows a relationship between a saw-tooth waveform of a single-turn PWM output and a five-turn PWM output.

The PWM output of the single turn angular position sensor is generated by comparing the received signal R to the reference signal S in a PWM generator 118 as shown in FIG. 4. For the single turn angular position sensor, the PWM generator may simply be a flip flop, such as an RS flip flop. FIGS. 5A and 5B illustrate, respectively, S, R and PWM outputs for 10% duty cycle and 40% duty cycle. The PWM output is also provided to an PWM to analog converter 120. A saw tooth waveform 230 of the analog PWM output for the single turn angular position sensor is illustrated in FIG. 8.

Figure 6:
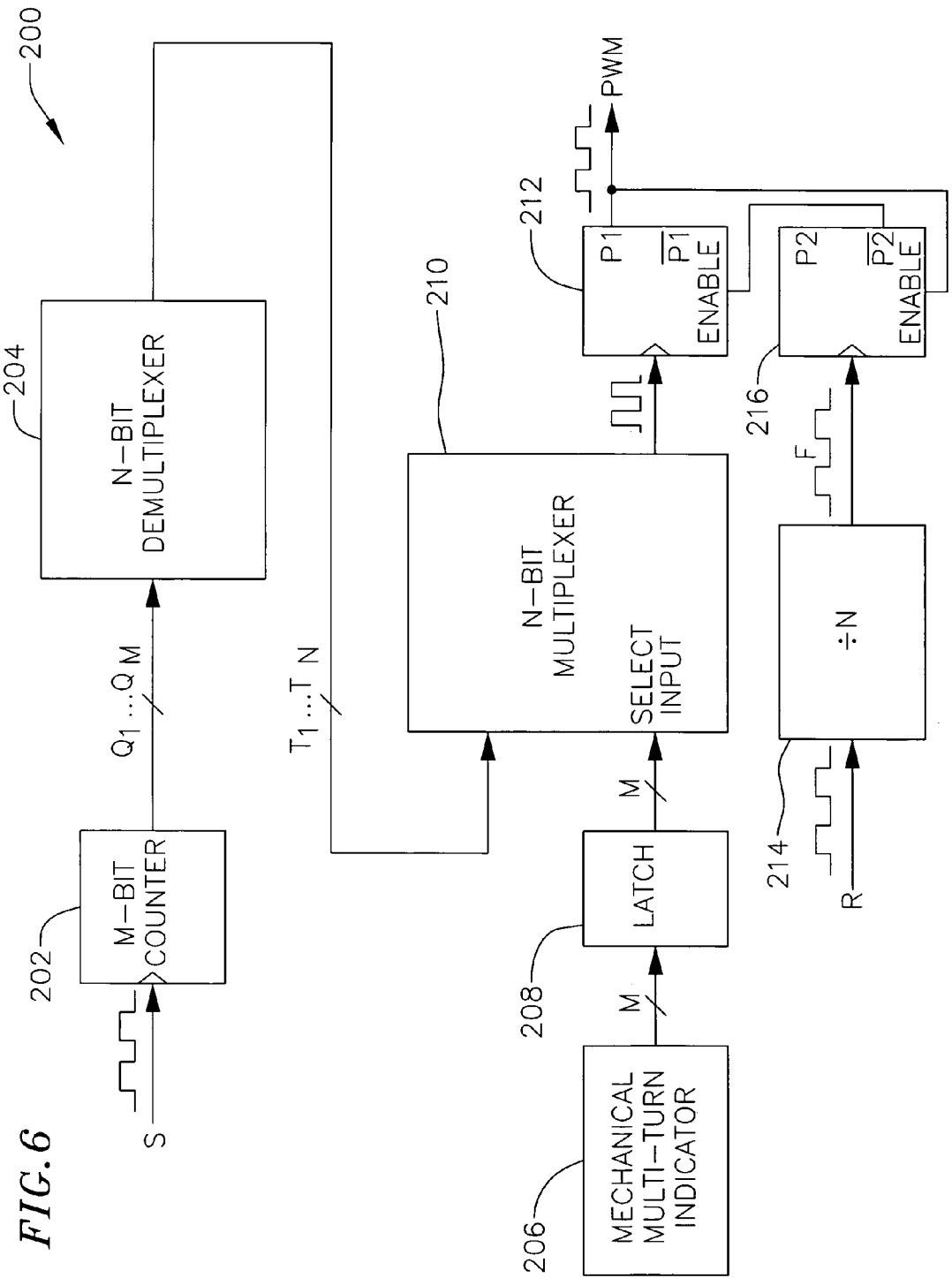
FIG. 6 is a block diagram of a multi-turn PWM generator in an exemplary embodiment of the present invention.

For a multi-turn angular position sensor, the PWM generator 118 of FIG. 4 is replaced by circuitry for generating a multi-turn PWM output. One such circuit is illustrated in FIG. 6 as a multi-turn PWM generator 200. The multi-turn PWM generator 200 generates a multiple-turn PWM output with substantially the same resolution and accuracy as the single-turn PWM generator by combining signals S and R using multi-turn counter circuitry.

The multi-turn PWM generator 200 includes an M-bit counter 202, which is capable of receiving and counting the number of cycles of the reference signal S. For example, the M-bit counter 202 can repeatedly count from 0 to $2^M-1$ by resetting to 0 upon reaching $2^M-1$. The M-bit counter 202 can also count from 0 to any number less than $2^M-1$ by programming the maximum number at which the counter is reset. The output of the M-bit counter 202, namely, M bits $Q_1$, through $Q_M$, are provided to an N-bit demultiplexer 204. The number N represents the number of turns of the multi-turn angular position sensor, and M is the number of bits used to represent N in binary format. Hence, the relationship between M and N is generally given by $M \approx \log_2 N$.

The N-bit demultiplexer 204 demultiplexes $Q_1$ through $Q_M$ to generate N turn indicator signals $T_1$ through $T_N$, each indicating one of the possible positions of a mechanical turn indicator 206. For example, the turn indicator signal $T_1$ corresponds to a first turn, whereas, the turn indicator signal $T_N$ corresponds to an Nth turn. The mechanical multi-turn indicator 206 generates an M-bit output corresponding to its initial position at the time of the power up. The initial position indication (i.e., the M-bit output) is then latched by a latch 208. The initial position indication remains fixed during normal system operation. The latch 208 will be reset upon system power down and subsequent power up.

The initial position indication is provided to an N-bit multiplexer 210 as a select input to select one of the N turn indicator signals. Since the initial position indication remains fixed during normal operations, the selected turn indicator signal also remains fixed during normal operations. For example, if the initial turn indication indicates the turn number to be three (3), then the T3 signal would be selected and remain selected until the system power down.

The received signal R is divided in frequency by N (the number of turns) in a frequency divider 214 to generate a frequency divided received signal F having the frequency of R/N. The frequency divided received signal F and the selected turn indicator signal are then provided to a pair of flip flops 212 and 216 to generate a multi-turn PWM output. The selected turn indicator signal is provided as a clock input to the flip flop 212, while the frequency divided received signal is provided as a clock input to the flip flop 216. An enable input of the first flip flop 212 is tied to an inverted output $\overline{P2}$ of the second flip flop 216. An enable input of the second flip flop 216 is tied to an output P1 of the first flip flop 212, which is also the multi-turn PWM output.

Figure 7:
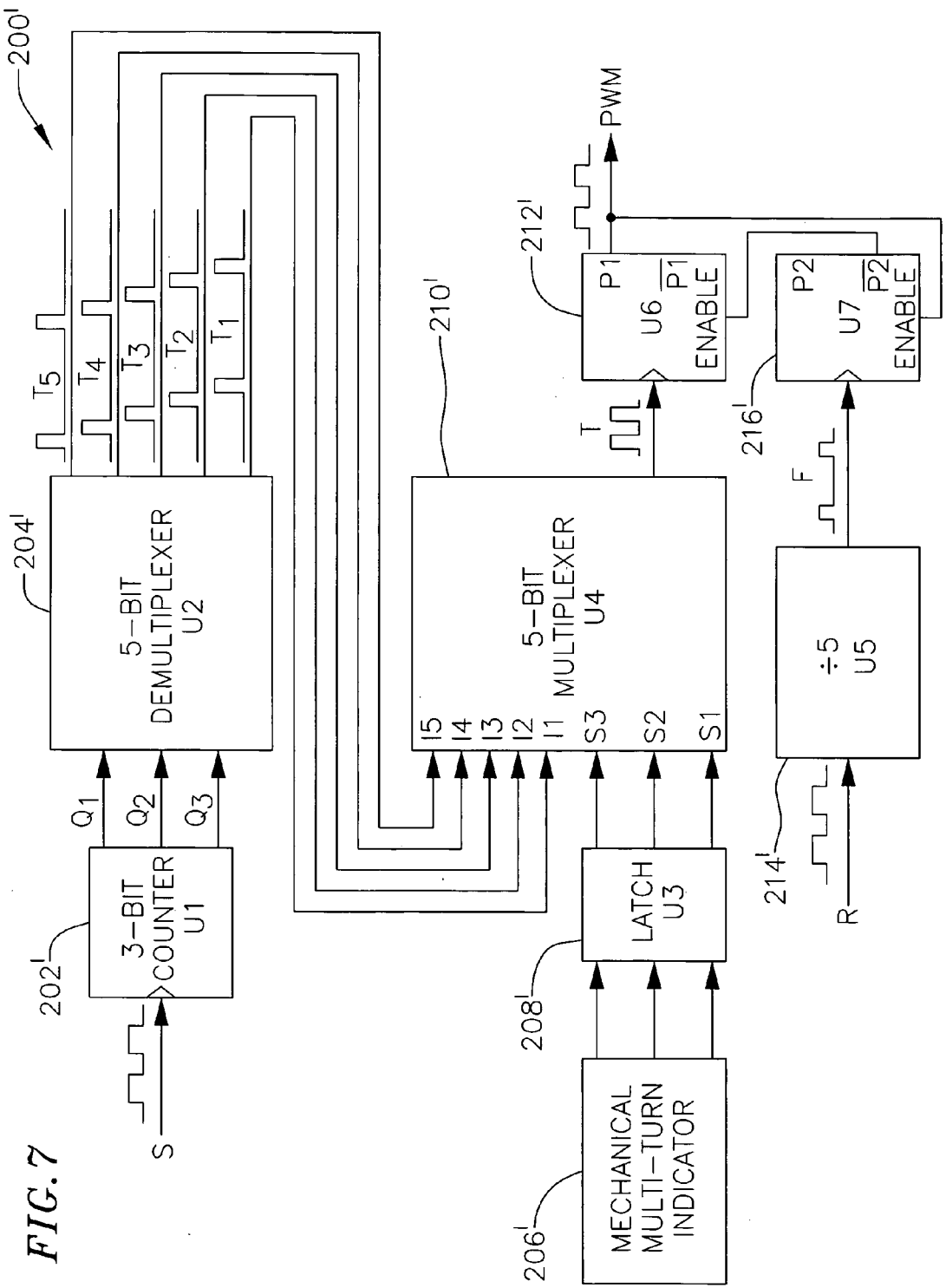
FIG. 7 is a block diagram of a multi-turn PWM generator of FIG. 6 when the number of turns N=5.

The functionality of the multi-turn PWM generator 200 can perhaps be better described in reference to FIG. 7, which illustrates a five-turn PWM generator 200' for the case of N=5. The five-turn PWM generator 200' of FIG. 7 is a special case of the multi-turn PWM generator 200 of FIG. 6. As such, the signals, components, interconnections and the functionality of the five-turn PWM generator 200' are substantially the same as corresponding signals, components, interconnections and the functionality of the multi-turn PWM generator 200. Hence, the reference numerals used to designate the components in the five-turn PWM generator 200' simply have a prime (') added to the reference numerals used to designate corresponding components in FIG. 6.

Since N=5, based on the above relationship between N and M, $M = \log_2 N = \log_2 5 \approx 3$. Therefore, a 3-bit counter 202' is used to generate a 3-bit output $Q_1$, $Q_2$ and $Q_3$ that are provided to a 5-bit demultiplexer 204'. The 5-bit demultiplexer 204' generates five turn indicator signals, each of which has a period corresponding to five clock cycles of the reference signal S. For the five-turn PWM generator 200', a single angular position sensor or any other suitable sensor must turn five revolutions in order to complete one full duty cycle from 0% to 100%. For example, FIG. 8 shows the relationship of the PWM saw-tooth output waveform between a single turn angular position sensor and a five-turns angular position sensor in analog format. It can be seen in FIG. 8 that the single-turn PWM output 230 completes five full duty cycles from 0% to 100% while the five-turn PWM output 240 completes a single full duty cycle.

Referring back to FIG. 7, the 3-bit binary counter 202' counts up to 5 and re-starts counting over again. A 5-bit demultiplexer 204' receives the three bit output $Q_1$, $Q_2$ and $Q_3$ of the 3-bit binary counter 202', and generates five turn indicator signals $T_1$, $T_2$, $T_3$, $T_4$ and $T_5$. Each of the turn indicator signals represents an output signal of one of the five positions of a mechanical position indicator 206'. The mechanical multi-turn indicator 206' generates a 3-bit output corresponding to its initial position at the time of the power up. The initial position indication (i.e., the 3-bit output) is then latched by a latch 208'. The initial position indication remains fixed during normal system operation. The latch 208' will be reset upon system power down and subsequent power up.

The five turn indicator signals $T_1$, $T_2$, $T_3$, $T_4$ and $T_5$ are fed into a 5-bit multiplexer 210' that outputs one turn indicator signal T which is determined by the actual turn of the mechanical position indicator in binary format upon power-up. The latch 208' provides the mechanical turn indication to the 5-bit multiplexer 210' to make the selection of the output turn indicator signal T.

The received signal R is divided by five by a frequency divider 214' to generate a frequency divided received signal F, which is used in combination with the turn indicator signal T to generate a five-turn PWM output. Every positive transition (i.e., rising edge) of the turn indicator signal T sets the output of a flip flop 212', and every positive transition (i.e., rising edge) of the frequency divided received signal F triggers a flip flop 216' to reset it. In this manner, the phase of the combined received signal R must shift by 5×(2π) (i.e., the coupler disk must make five revolutions) in order to complete one full cycle from 0% to 100% of the five-turn PWM output. This creates the five-turn PWM signal output based on five revolutions of the single turn (0° to 360°) angular position sensor operation.

Figure 9:
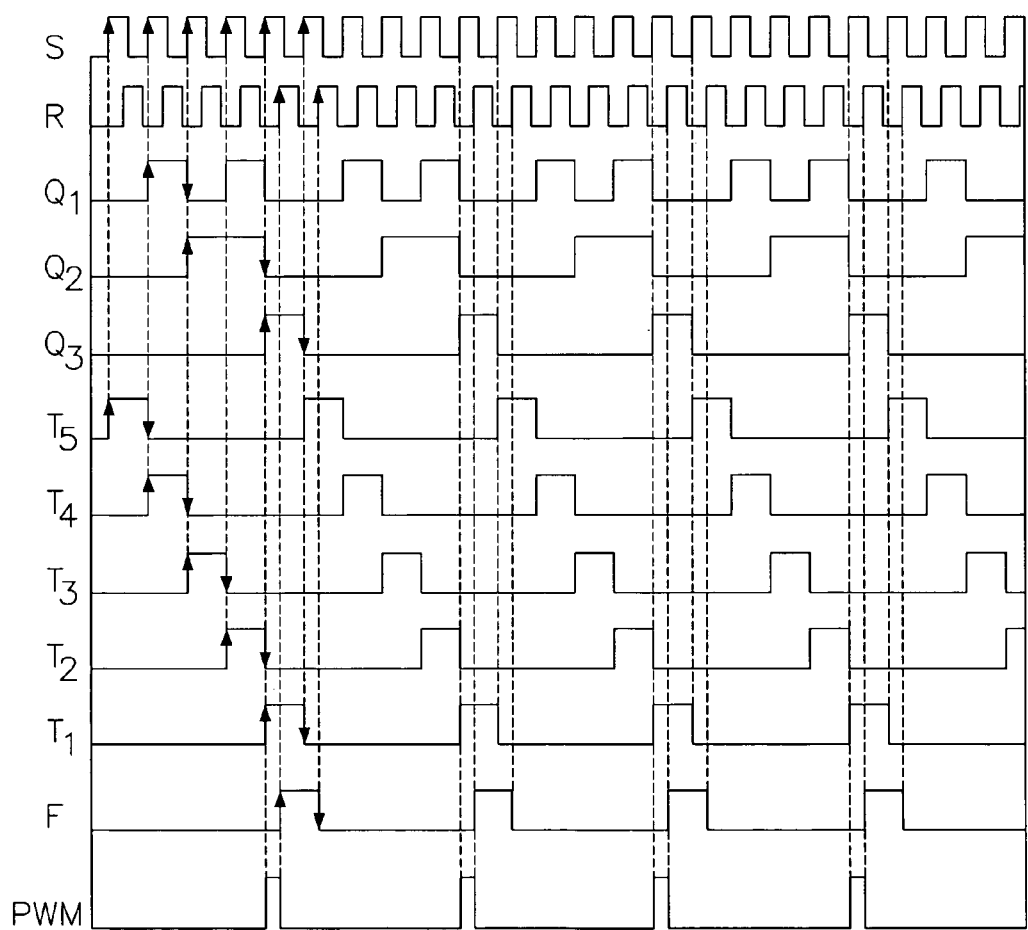
FIG. 9 is a timing diagram of a five-turn angular position sensor in the exemplary embodiment of FIG. 7.

FIG. 9 illustrates a complete timing diagram of the five-turn PWM generator 200' of FIG. 7. It can be seen that the reference signal S and the received signal R have substantially the same frequency, but are offset in phase with respect to each other. The output of the 3-bit counter 202' is initially set to all zero. Since the 3-bit counter 202' is a 3-bit synchronous counter in the described exemplary embodiment, $Q_1$ toggles on each rising edge of the reference signal S, $Q_2$ toggles on the rising edge of the reference signal S only when $Q_1$ is high, and $Q_3$ toggles on the rising edge of the references signal S only when $Q_1$ and $Q_2$ are both high. The bits $Q_1$, $Q_2$ and $Q_3$ may also toggle upon reset of the 3-bit counter 202'.

The 3-bit counter 202' continues to increment on every successive clock pulses of the reference clock signal S until ($Q_3$, $Q_2$, $Q_1$) reaches 100 (binary 4). On the next clock pulse of the reference clock signal S, the 3-bit counter 202' resets to zero. As the counter is counting from 0 to 4, five turn indicator signals ($T_1$, $T_2$, $T_3$, $T_4$ and $T_5$) are generated by the 5-bit demultiplexer 204'. Each of the turn indicator signals represents one of the five positions of the mechanical position indicator.

The five signal outputs of the 5-bit demultiplexer 204' are received by the 5-bit multiplexer 210', and selected by the output of the mechanical turn indicator 206', which indicates the actual turn-position of the mechanical turn indicator at the time of power up. In other words, the turn indicator signal $T_1$ corresponds to the first turn of the mechanical turn position indicator, $T_2$ corresponds to the second turn, $T_3$ corresponds to the third turn, $T_4$ corresponds to the fourth turn, and $T_5$ corresponds to the fifth turn. The selected one of the turn indicator signals, therefore, is used as a reference pulse for the five-turn PWM generator based on the actual mechanical position upon power-up.

The frequency divided received signal F is also generated by dividing the received signal R in the frequency divider 214'. The frequency divided received signal F signal in combination with the selected one of the turn indicator signals as described above generates the five-turn PWM output. The PWM output waveform shown in FIG. 9 is generated when the mechanical multi-turn indicator 206' indicates the starting position at the first turn upon power-up. Since $T_1$ represents the signal output at the first turn, it is selected as the reference signal in the five-turn PWM generator 200'. The five-turn PWM output therefore is generated by combining the signals $T_1$ and F.

Therefore, in exemplary embodiments of the present invention, a PWM circuit which converts a single cycle PWM (0°–360°) to multi-turn PWM is provided. The PWM circuit can be used in conjunction with NCAPS for use as a steering angle sensor with a lock-to-lock range of ±2.5 turns of the steering wheel from the center position. For example, if the five-turn angular position sensor is used in a steering wheel of an automobile, which can make five complete revolutions, the third turn may represent the steering wheel at a center position, in which the wheels are pointing straight ahead. The first turn may represent the driving wheel that has been turned all the way to the left, and the fifth turn may represent the driving wheel that has been turned all the way to the right.

Figure 10:
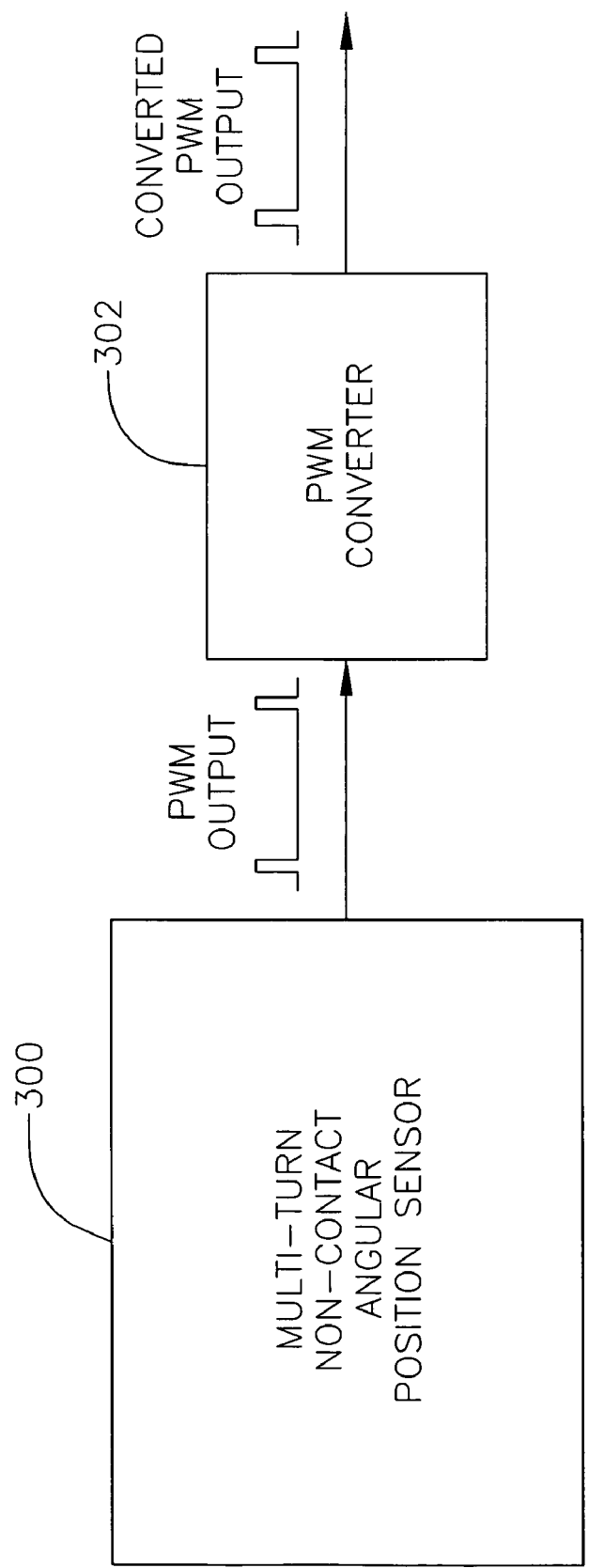
FIG. 10 is a block diagram of a multi-turn PWM generation system in another exemplary embodiment of the present invention.

In FIG. 10, a PWM output of an MT-NCAPS 300 is coupled to a PWM converter 302 in another exemplary embodiment of the present invention. The MT-NCAPS 300, for example, may have substantially the same structure as the angular position sensor 100 of FIG. 4, when the multi-turn PWM generator 200 of FIG. 6 or the multi-turn PWM generator 200' of FIG. 7 is used as the PWM generator 118. The PWM converter 302 receives the PWM output, which has a 0% to 100% duty cycle, and converts the PWM output to any desired start and stop duty cycle range, for example, 5% to 95%. The PWM converter 302, for example, may be substantially the same as the digitally programmable PWM converter disclosed in U.S. Pat. No. 6,545,621 entitled "Digitally Programmable Pulse-Width Modulation (PWM) Converter" issued Apr. 8, 2003, the entire content of which is incorporated by reference herein.

While certain exemplary embodiments of the present invention have been described above in detail and shown in the accompanying drawings, it is to be understood that such embodiments are merely illustrative of and not restrictive of the broad invention. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

For example, while the exemplary embodiments of the present invention have been described above in reference to the NCAPS, the programmable, MT-PWM circuit of the present invention can be used with any rotary or linear sensor with a compatible PWM output.

What is claimed is:

1. A multi-turn pulse width modulation (PWM) generator for generating a PWM output corresponding to multiple 360 degree turns, comprising:
   a counter for receiving a reference signal, and for counting a number of cycles of the reference signal to generate a binary output corresponding to the number of cycles counted;
   a frequency divider for receiving a sensor output signal, and for dividing a frequency of the sensor output signal by the number of turns in the multiple turns to generate a frequency divided signal, wherein the sensor output signal has substantially the same frequency as the reference signal, but can be offset in phase from the reference signal;
   a demultiplexer for receiving the binary output, and for generating a plurality of turn indicator signals, each corresponding to one of the multiple turns;
   a multiplexer for receiving the turn indicator signals and a mechanical turn indicator signal, and for selecting one of the turn indicator signals that corresponds to the mechanical turn indicator signal; and
   at least one flip flop for receiving the selected one of the turn indicator signals and the frequency divided signal, and for generating the PWM output using the selected one of the turn indicator signals and the frequency divided signal.

2. The multi-turn PWM generator of claim 1, wherein a duty cycle of the PWM output is determined by a difference in phase between the selected one of the turn indicator signals and the frequency divided signal.

3. The multi-turn PWM generator of claim 1, wherein the at least one flip flop comprises a first flip flop for receiving the selected one of the turn indicator signals and a second flip flop for receiving the frequency divided signal,
   wherein an output of the second flip flop is provided to a first flip flop as an input,
   wherein each rising edge of the selected one of the turn indicator signals sets the first flip flop, and wherein each rising edge of the frequency divided signal resets the first flip flop, and
   wherein an output of the first flip flop is the PWM output.

4. The multi-turn PWM generator of claim 1, wherein the counter repeatedly counts from 0 to the number of turns minus 1, and resets.

5. The multi-turn PWM generator of claim 1, further comprising a latch for storing the mechanical turn indicator signal, wherein a content of the latch does not change during normal operation of the multi-turn PWM generator.

6. The multi-turn PWM generator of claim 1, wherein the number of turns is five.

7. The multi-turn PWM generator of claim 1, wherein the counter is an M-bit counter, wherein M is calculated using $\log_2$(the number of turns).

8. A multi-turn angular position sensor for sensing rotation about an axis comprising:
   a transmitter disk having a plurality of transmitter loop antennas formed thereon;
   a receiver disk having a plurality of receiver loop antennas formed thereon, each said receiver loop antenna corresponding to one of the transmitter loop antennas, wherein the transmitter disk and the receiver disk are substantially fixed with respect to each other about the axis;

a coupler disk having an attenuation pattern formed thereon for variably attenuating signals transmitted from the transmitter loop antennas and received by the receiver loop antennas, wherein the coupler disk is rotatable about the axis with respect to the transmitter and receiver disks;

a digital signal generator for generating a plurality of local oscillator signals and a reference signal;

a mixer for receiving the local oscillator signals and the signals received by the receiver loop antennas, and for generating a sensor output signal representing an angular position of the coupler disk about the axis; and a multi-turn PWM generator for generating a PWM output corresponding to multiple 360 degree turns, comprising:

a counter for receiving a reference signal, and for counting a number of cycles of the reference signal to generate a binary output corresponding to the number of cycles counted;

a frequency divider for receiving the sensor output signal, and for dividing a frequency of the sensor output signal by the number of turns in the multiple turns to generate a frequency divided signal, wherein the sensor output signal has substantially the same frequency as the reference signal, but can be offset in phase from the reference signal;

a demultiplexer for receiving the binary output, and for generating a plurality of turn indicator signals, each corresponding to one of the multiple turns;

a multiplexer for receiving the turn indicator signals and a mechanical turn indicator signal, and for selecting one of the turn indicator signals that corresponds to the mechanical turn indicator signal; and at least one flip flop for receiving the selected one of the turn indicator signals and the frequency divided signal, and for generating the PWM output using the selected one of the turn indicator signals and the frequency divided signal.

9. The multi-turn angular position sensor of claim 8, wherein a duty cycle of the PWM output is determined by a difference in phase between the selected one of the turn indicator signals and the frequency divided signal.

10. The multi-turn angular position sensor of claim 8, wherein the at least one flip flop comprises a first flip flop for receiving the selected one of the turn indicator signals and a second flip flop for receiving the frequency divided signal, wherein an output of the second flip flop is provided to a first flip flop as an input, wherein each rising edge of the selected one of the turn indicator signals sets the first flip flop, and wherein each rising edge of the frequency divided signal resets the first flip flop, and wherein an output of the first flip flop is the PWM output.

11. The multi-turn angular position sensor of claim 8, wherein the counter repeatedly counts from 0 to the number of turns minus 1, and resets.

12. The multi-turn angular position sensor of claim 8, wherein the multi-turn PWM generator further comprises a latch for storing the mechanical turn indication signal, wherein a content of the latch does not change during normal operation of the multi-turn PWM generator.

13. The multi-turn angular position sensor of claim 8, further comprising an analog converter for converting the PWM output to an analog signal output.

14. The multi-turn angular position sensor of claim 8, wherein the PWM output has a duty cycle of 0% to 100%, the sensor further comprising a PWM converter for converting the PWM output to have a duty cycle different from 0% to 100%.

15. A method of generating a multi-turn pulse width modulation (PWM) signal corresponding to multiple 360 degree turns, comprising:

counting a number of cycles of a reference signal to generate a binary output corresponding to the number of cycles counted;

dividing a frequency of a sensor output signal by the number of turns in the multiple turns to generate a frequency divided signal, wherein the sensor output signal has substantially the same frequency as the reference signal, but can be offset in phase from the reference signal;

generating a plurality of turn indicator signals using the binary output, each said turn indicator signal corresponding to one of the multiple turns;

selecting one of the turn indicator signals that corresponds to a mechanical turn indicator signal; and generating the PWM output using the selected one of the turn indicator signals and the frequency divided signal.

16. The method of claim 15, wherein a duty cycle of the PWM output is determined by a difference in phase between the selected one of the turn indicator signals and the frequency divided signal.

17. The method of claim 15, wherein generating the PWM output comprises:

setting a flip flop using each rising edge of the selected one of the turn indicator signals; and resetting the flip flop using each rising edge of the frequency divided signal, wherein an output of the first flip flop is the PWM output.

18. The method of claim 15, wherein counting comprises:

repeatedly counting from 0 to the number of turns minus 1, and resetting.

19. The method of claim 15, further comprising storing the mechanical turn indicator signal in a latch, wherein a content of the latch does not change during normal operation of the multi-turn PWM generator.

20. A multi-turn pulse width modulation (PWM) generator for generating a PWM output corresponding to multiple 360 degree turns, comprising:

circuit means for receiving a reference signal and a mechanical turn indicator signal, and for generating, using the reference signal, a turn indicator signal that corresponds to the mechanical turn indicator signal;

a frequency divider for receiving a sensor output signal, and for dividing a frequency of the sensor output signal by the number of turns in the multiple turns to generate a frequency divided signal, wherein the sensor output signal has substantially the same frequency as the reference signal, but can be offset in phase from the reference signal; and at least one flip flop for receiving the turn indicator signal and the frequency divided signal, and for generating the PWM output using the turn indicator signal and the frequency divided signal.

* * * * *